Aug. 31, 1965

R. S. WILLIS ETAL

3,203,266

VALVE MECHANISMS

Filed Sept. 10, 1962

ROBERT S. WILLIS
WILLIAM J. BAKER
INVENTORS

BY
Paul A. Weilein
ATTORNEY

ROBERT S. WILLIS
WILLIAM J. BAKER
INVENTORS

BY
Paul A. Weilein
ATTORNEY

United States Patent Office 3,203,266
Patented Aug. 31, 1965

3,203,266
VALVE MECHANISMS
Robert S. Willis, Long Beach, and William J. Baker, Anaheim, Calif.; said Baker assignor to said Willis; N. Elizabeth Willis, executrix of Robert S. Willis, deceased
Filed Sept. 10, 1962, Ser. No. 222,413
9 Claims. (Cl. 74—128)

The present invention relates generally to valve mechanisms, and more especially to power means which are operable to selectively accurately position the valve at a plurality of operating positions.

It is a serious problem in certain types of valves, including those of the rotary type, particularly when they are remotely controlled or power operated, to set them at a desired position between the fully opened and closed positions. In each of the latter positions, it is possible to have stop means limiting the valve movement so that the valve stops at a known position in which it is fully opened or closed. However, such stop or limiting means cannot be applied directly to a valve at intermediate or partially open positions because such means would then interfere with movement of the valve beyond the stop means. There are many situations, as for example when a valve is used to meter fluid flow, in which it is necessary that the valve be accurately positioned at some position intermediate its full range of travel, while remaining free to continue movement.

Knowledge of the position of the valve should be readily available at all times and, consequently, it is desirable that the position of the valve should be indicated visually. When the valve is remotely controlled, it is especially desirable that such position indication be present at the remote control station, either in addition to or instead of the indicating means located at the valve.

Thus, it is one object of the present invention to provide a valve mechanism which is accurately positioned not only at terminal opened and closed positions, but also at selected positions intermediate the fully opened and closed positions.

A further object of the invention is to provide a power operator for a valve, which is controlled from a remote station having means for indicating the position of the valve accurately at all times.

A further object is to provide a power operator for a valve in which the valve will be actuated in step-by-step accurately repeated movements of known amount, whereby the number of movements determines the valve position and controls remote indicating means in accordance with these movements to indicate the valve position.

These and other objects of our invention have been achieved by providing a valve operator for a valve mechanism having a movable valve member, wherein the operator comprises means connected to and moving the valve member by repeated movements of predetermined amount. In case the valve is of the rotary type in which the movement of the valve itself is reversed in moving from closed to opened position and back to closed position, the valve driving member of the valve operator is moved in either one of two directions. The repeated movements being preferably equal and each of a predetermined amount, the algebraic sum of the number of such movements may be used as an indicator of the valve position, making possible the location of the indicator at a position remote from the valve installation.

The manner in which the above objects and advantages of our invention, as well as others not specifically mentioned herein, are attained will be more readily understood by reference to the following description and to the annexed drawings, in which.

Figures 1, 2, 5, 6, 7:
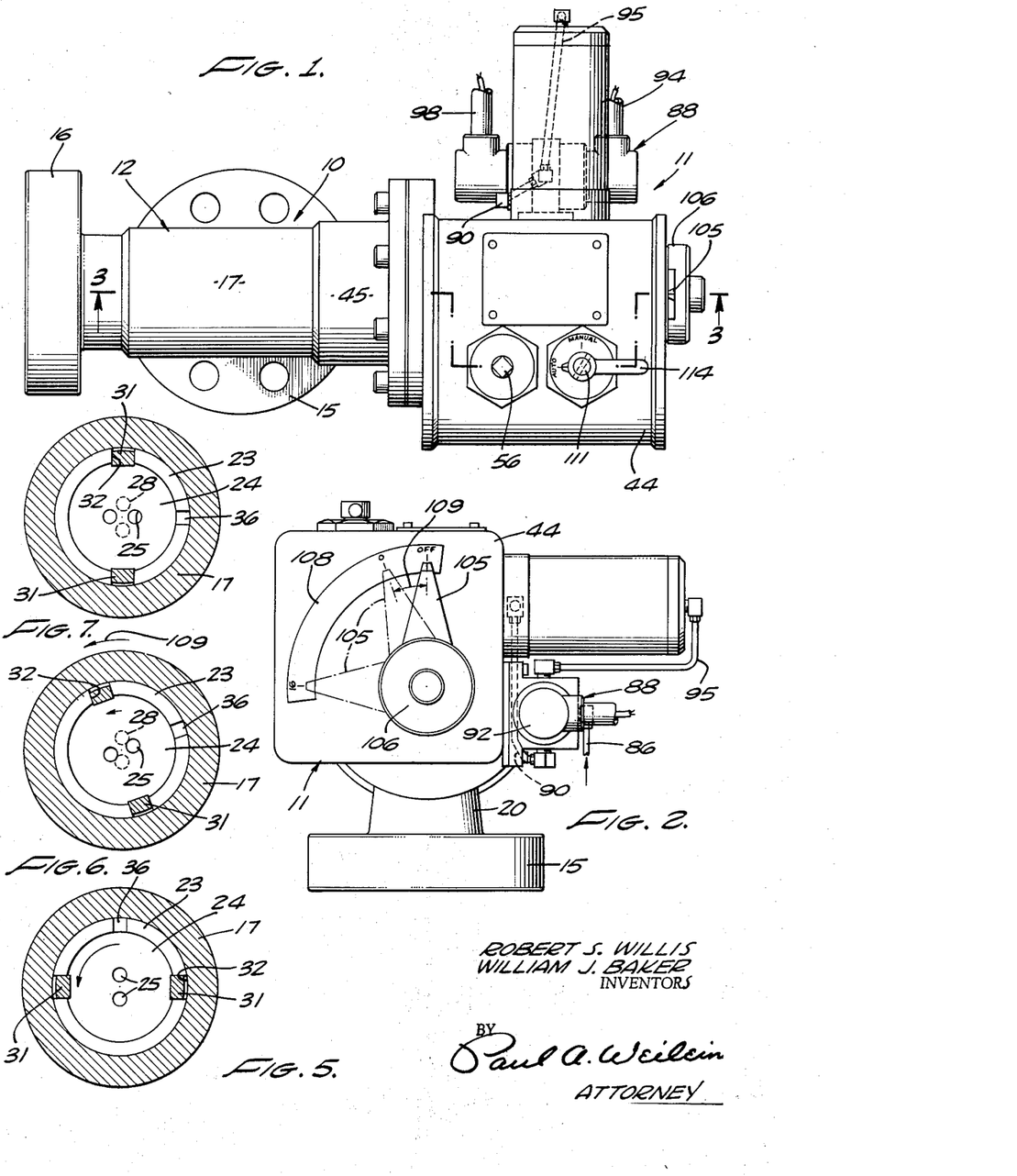
FIG. 1 is a plan view of a valve mechanism embodying a valve operator constructed according to the present invention.
FIG. 2 is an end elevation thereof viewed from the right hand side of FIG. 1.
FIG. 5 is a fragmentary vertical section substantially on line 5—5 of FIG. 3, showing the rotatable valve in fully opened position.
FIG. 6 is a view similar to FIG. 5 except that the rotatable valve member is shown in a position in which the valve starts to open.
FIG. 7 is also a view similar to FIG. 5 with the valve member in fully closed position.

Referring now to the drawings, and more particularly to FIGS. 1 and 2, there is shown therein a valve mechanism which includes a rotary valve as indicated generally at 10 and an operator therefor indicated generally at 11. The valve construction will be described first since an understanding of its operation will promote an understanding of the operator therefor.

Valve 10 is of the type wherein a pair of adjacent discs, each provided with one or more eccentric orifices are relatively rotated so as to move the orifices in one disc relative to those in the other disc, thereby enlarging the area of the open flow passage through the orifices in the discs or reducing the area of such flow passage, according to the direction of rotation. The construction of such valve is seen more fully in FIG. 3 wherein the valve is shown as comprising a body 12 having an inlet passage 13 and an outlet passage 14. Body 12 is of the so-called L-flange type and is provided with a flange 15 at the inlet passage by means of which the valve may be connected to a source of fluid. A similar flange 16, shown in FIG. 1, provides means whereby the valve may be connected to a conduit through which liquid is discharged. Body 12 includes a main section 17 having a longitudinally extending bore 18 extending therethrough. The secondary body section 20 containing inlet passage 13 may be welded or otherwise suitably secured to body section 17. As shown clearly in FIG. 3, inlet section 13 communicates through the wall of body section 17 with the bore 18 therein.

Figures 3, 4:
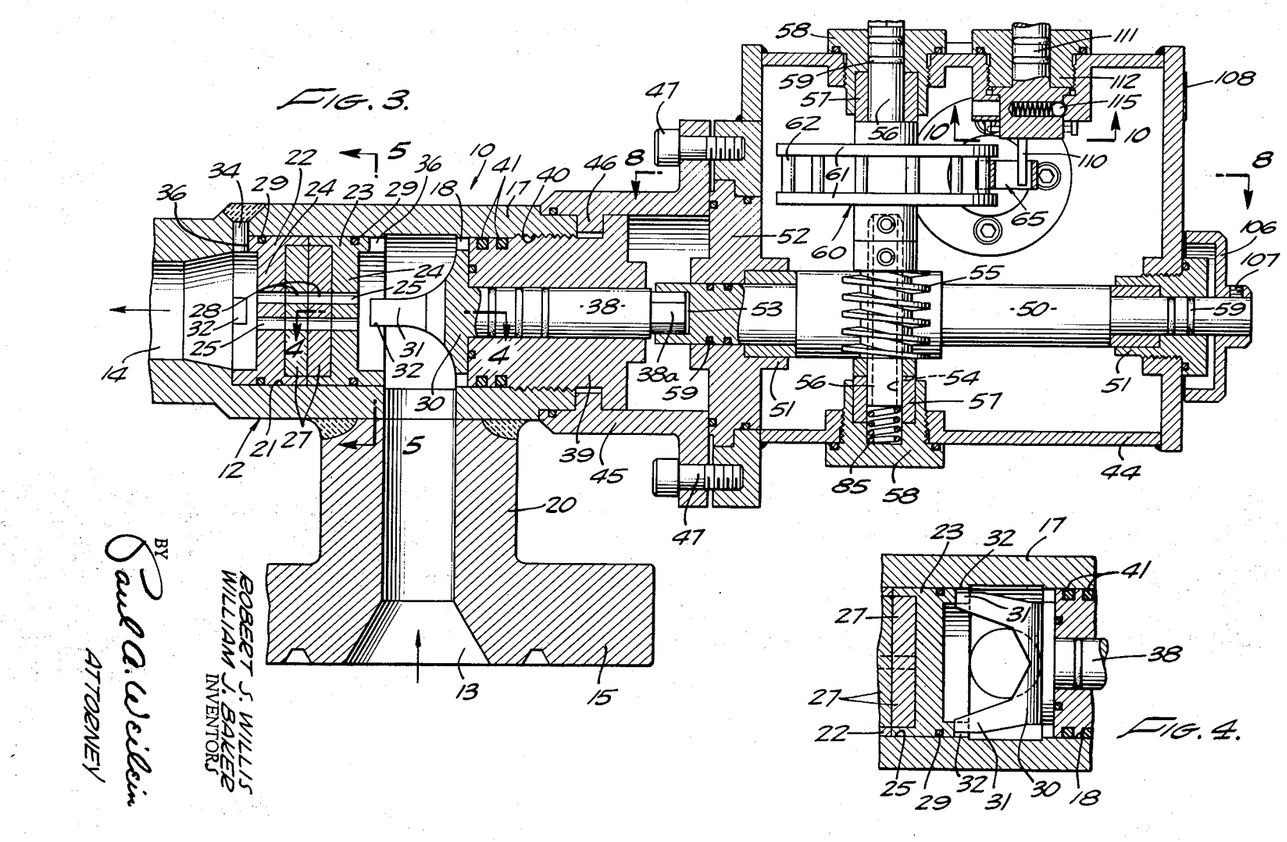
FIG. 3 is an enlarged vertical median section, taken substantially on line 3—3 of FIG. 1.
FIG. 4 is a fragmentary horizontal section substantially on line 4—4 of FIG. 3, showing details of the driving connection with the rotatable valve.

Main body section 17 is provided with a cylindrical valve seat 21 at the forward or inner end of bore 18. Within the seat there is disposed a pair of contiguous disc carriers 22 and 23. Each disc carrier is circular in outline to fit snugly within seat 21 and is provided with an internal web 24 provided with a pair of similar ports 25 offset radially from the axis of the carrier. Adjacent web 24 each of the disc carriers 22 and 23 is provided with a seat in which a removable valve disc 27 fits tightly enough not to rotate relative to its carrier. Each disc 27 has a pair of openings 28 extending through it. Openings 25 in the disc carrier web and openings 28 in the disc are so disposed as to be capable of mutual alignment in order to permit the flow of fluid through each disc carrier and its associated disc. With the respective disc carriers and discs in at least one rotational position, the openings through the disc carriers and discs are aligned as shown in FIGS. 3 and 5 in order to allow flow of fluid through body section 17 between inlet passage 13 and outlet passage 14.

In order to prevent leakage of fluid between the disc carriers and the inside wall of body section 17, each of the disc carriers is preferably provided with suitable sealing means, such as O-ring seals 29.

Means are provided for adjusting the angular position of one disc 27 relative to the other disc 27 by rotation of inner disc 27 and its carrier 23. Thereby the openings 28 and 25 therein can be moved into or out of registration with the corresponding openings in the other disc 27 contained in carrier 22. Such adjusting means is in the form of a forked member 30 disposed within bore 18 of the main body section 17 and having a pair of laterally spaced fingers 31 engageable with a pair of diametrically opposed recesses 32 in disc carrier 23, as shown more particularly in FIG. 4. Upon rotation of the forked member 30, disc carrier 23 and the associated disc 27 may be rotated about the axis of the bore 18 and more especially the section constituting cylindrical seat 21. Relative angular adjustment of the openings in the two discs requires that carrier 22 and its disc 27 be held against rotation; and this is accomplished by providing fixed pin 34 mounted in body section 17 and engageable in a suitable notch in the periphery of disc carrier 22. A similar notch is shown in the periphery of disc carrier 23 at 36, as it is preferable that the two carriers be duplicates of each other in order to be interchangeable.

Turning fork 30 is mounted on the inner end of stem 38 which is rotatably mounted in and extends through plug 39 which in turn is inserted in one end of bore 18, being held in place by suitable means such as threads 40. Fluid flow between the plug and the bore wall is prevented by suitable sealing means such as O-ring seals 41.

When the openings 28 in the two discs are aligned as shown in FIG. 3 and FIG. 5, the aligned openings provide for maximum fluid flow between inlet 13 and outlet 14. When rotation of carrier 23 by fork 31 rotates openings 28 in the associated disc through an angle of 90°, as shown in FIG. 7, then the two sets of openings 28 are completely misaligned and flow through them is completely shut off. As will be explained further, it is evident that at intermediate positions, the two sets of openings more or less overlap and as a result fluid flow through them is restricted to a greater or lesser degree depending upon the extent of the mutual overlap.

The exemplary valve described above is a rotary valve designed essentially to meter or restrict to a controlled extent fluid flow through the valve between the inlet and the outlet. It has a particular application to producing oil wells as a means located at the well head to regulate fluid flow. This valve is disclosed and claimed in the co-pending application of Robert S. Willis, Serial No. 92,941 filed March 2, 1961, for Multiple Orifice Valve, and reference may be had to the co-pending application for greater detail. The present invention is not necessarily limited to use with a valve of this character; but the valve operator has certain characteristics which are advantageous when combined with a rotary valve of this character.

Figures 8, 10:
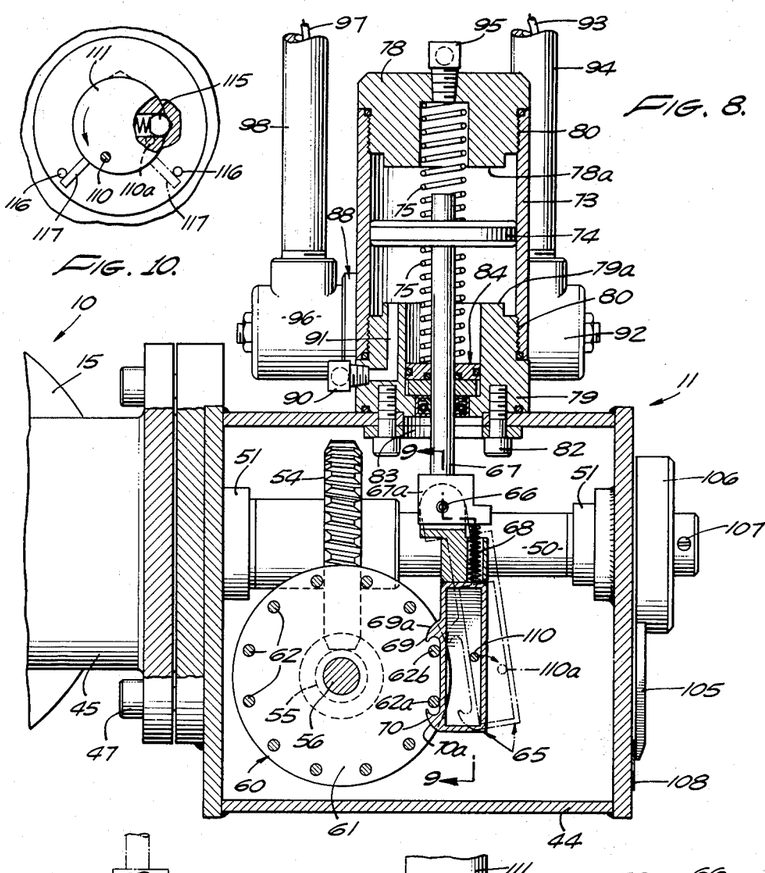
FIG. 8 is a horizontal section substantially on line 8—8 of FIG. 3, showing details of certain parts of the valve operator, and in which the ratchet thereof is in one position.
FIG. 10 is a fragmentary view partially in section, taken substantially on line 10—10 of FIG. 3.

Considering now in greater detail the valve operator, it will be seen from FIGS. 3 and 8 that valve operator 11 is contained within a housing 44 which is mounted on the valve body 17 in any suitable manner, for example, by adapter 45 which is bored at one end to receive the cylindrical end of valve body section 17. Adapter 45 has an internal flange 46 which can be gripped between the end of valve body 17 and an annular flange on plug 39 so that the adapter is held firmly in place when the plug is screwed into the valve body. Main housing 44 of the operator is then bolted or otherwise attached to the adapter, machine screws 47 being provided in the embodiment illustrated for this purpose.

The valve operator comprises a valve operating member in the form of shaft 50 rotatably mounted in a pair of journal bearings 51 mounted in two opposite walls of housing 44. One of the bearings 51 may be in a movable section 52 of the housing wall which is made movable for ease of access to the interior and assembly, this section 52 being held in place by engagement with the flanged end of adaptor 45 when screws 47 are tightened. However, it will be realized that other constructions may be equally well adapted for this purpose. Shaft 50 is recessed at one end to form socket 53 that receives the squared end 38a of valve-turning stem 38.

Suitably attached to shaft 50 is worm wheel 54 which meshes with and is driven by worm 55. Worm 55 is non-rotatably attached in any suitable manner to cross shaft 56 which is rotatably mounted at its ends in a pair of journal bearings 57 each in a suitable removable bushing 58 in the housing wall. Both shafts 50 and 56 are preferably provided with sealing means, such as O-ring seals 59, where the shafts extend through the housing walls to prevent leakage.

Also non-rotatably mounted on shaft 56 is a ratchet wheel indicated generally at 60. This ratchet wheel comprises a pair of spaced, parallel discs 61 between which extend a plurality of pins 62 rigidly mounted at their ends on the discs. These pins are arranged annularly at equal distances from the center of shaft 56 and also arranged with equal angular spacings between successive pins. These pins are engaged by a pawl 65 which is pivotally connected at 66 to reciprocating rod 67. At the end of pawl 65 adjoining rod 67, the pawl is provided with a well in which is located compression spring 68. The spring bears at one end against the pawl and at the other end against a stationary head 67a on the end of rod 67. The force of the spring tends to swing the pawl clockwise around pivot 66, when viewed as in FIG. 8, thus urging the pawl into contact with ratchet pins 62. At the same time, spring 68 yields to allow limited pivotal movement of the pawl for reasons that will become apparent.

At one side, pawl 65 has a pair of spaced, oppositely facing pin engaging elements 69 and 70. The inner opposing faces of the two elements 69 and 70 are preferably concave in order to firmly engage and hold the ratchet pin 62 without slipping. By contrast, the rear or outer faces 69a and 70a of each of the elements 69 and 70, respectively, are curved or gently sloping as shown, in order that upon engagement of a face with a pin 62, the face acts as cam means deflecting the pin engaging element and pawl 65 away from driving engagement with the pins, as will be more fully explained.

Reciprocating rod 67 is the drive member of motor means which includes cylinder 73, piston 74 reciprocable within the cylinder, and a pair of springs 75 each of which bears at one end against one of the two opposite faces of piston 74. Cylinder 73 is closed at both ends by any suitable means, as for example, plugs 78 and 79 suitably attached to the cylinder wall, as by threads at 80. Plugs 78 and 79 not only provide end walls for the cylinder, but provide abutment means engaging the other ends of springs 75 so that the two springs normally urge the piston to a normal rest position which, as shown in FIG. 8, is preferably at or near the midpoint of the cylinder. In addition, the plugs 78 and 79 have inner opposing faces 78a and 79a, respectively, that provide stop means limiting the travel of the piston in either direction away from this rest position in order to determine the end of each power stroke. The motor means consisting of the elements just mentioned, together with valve means controlling supply of operating fluid to the cylinder, to be described, is mounted on one wall of housing 11 by machine screws 82 or other suitable means. In this position, reciprocating drive rod 67 extends through an opening 83 in the housing wall which registers with a suitable opening in plug 79 through which rod 67 passes. Plug 79 holds a suitable bearing and sealng means 84 for piston rod 67.

The motor means is operated by introducing operating fluid under pressure into the cylinder at a selected side of piston 74. Convenient for this purpose is compressed air, but it will be realized that hydraulic fluid may be equally well utilized for this purpose. To operate the motor means, operating fluid is supplied to cylinder 73 through conduit means controlled by suitable valves, including supply line 86 (FIG. 2) which is connected to any suitable source of operating fluid under pressure, not shown. Supply line 86 is connected to control valve 88 which may be of any suitable design, but for purposes of description here is shown to be a three-position valve operated by suitable solenoids, as shown diagrammatically in FIG. 11.

Valve 88 has a conduit 90 connected to passageway 91 in cylinder head plug 79. Fluid flow through this passage into cylinder 73 at one side of piston 74 is controlled by solenoid 92 which is energized by electrical conductors 93 contained in conduit 94. A second conduit 95 leads from valve 88 to a connection at cylinder head plug 78 to introduce operation fluid into the cylinder at the opposite side of piston 74, flow of operating fluid being controlled by solenoid 96 which is energized by current carried through conductors 97 contained in conduits 98. Valve 88 may be of any suitable design, for example, one having a shiftable spool 99 which in a normal rest position shuts off supply of air to the valve from supply line 86. Upon energization of either one of the solenoids 92 and 96, spool 99 is shifted longitudinally in a direction to place one of the conduits 90 or 95, as may be selected, into communication with supply line 86 while causing the other of the conduits 90 and 95 to be in communication with an exhaust line 100. In the case of compressed air as an operating fluid, the exhaust lines 100 vent to the atmosphere; but if a hydraulic fluid is being used in the system, these lines constitute return lines communicating with the reservoir holding the supply of hydraulic fluid.

Figures 8A, 9:
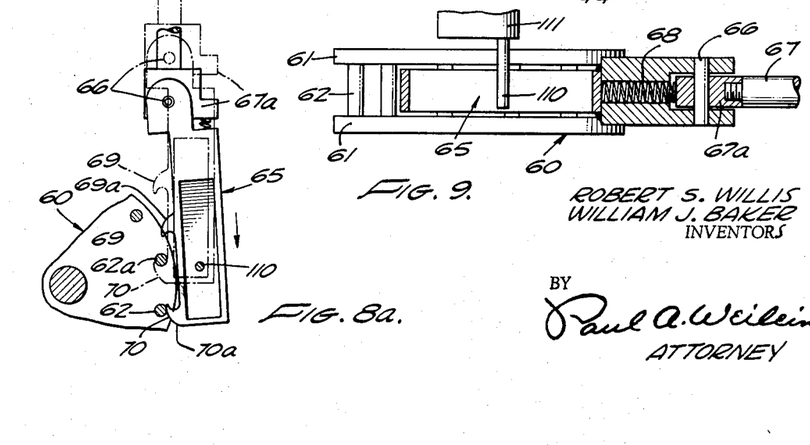
FIG. 8a is a fragmentary section similar to FIG. 8 showing other positions of the latchet.
FIG. 9 is a fragmentary section substantially on line 9—9 of FIG. 8, showing details of the ratchet pawl.

To operate the valve operator, all that is required is to energize one of solenoids 92 and 96. Assume for example that solenoid 96 is energized to open conduit 90, thus admitting operating fluid from supply line 86 through conduit 90 into the cylinder space at the near side of piston 74 as viewed in FIG. 8. The piston is then forced to move until it comes into contact with face 78a of head plug 78. Contact with this face limits the travel of the piston in this direction. The movement of the piston from the neutral rest position into contact with face 78a is the power stroke, taking place under force applied by the operating fluid and causing one of the springs 75 to yield and be compressed. The longitudinal movement of piston rod 67 pulls pin engaging element 70 on pawl 65 into engagement with the ratchet pin indicated at 62a, moving this pin to the position 62b at the end of the power stroke. The pawl is shown in dotted lines in FIG. 8a at this position. This pawl movement causes ratchet 60 to be revolved in a counterclockwise direction as viewed in FIG. 8. This motion is transmitted through worm 55 to worm wheel 54 and shaft 50. Shaft 50 being connected to stem 38 of fork 30, rotary motion of the operating member 50 is transmitted directly to disc carrier 23. This motion being in a clockwise direction when shaft 50 is viewed from the right hand end as in FIG. 8, the motion of disc carrier 23 is such as to move the disc from the closed position of FIG. 7 to the open position of FIG. 7 to the open position of FIG. 5.

When solenoid 96 is de-energized, supply of operating fluid through line 90 is cut off and the near side of piston 74 is placed in communication with the atmosphere, assuming that compressed air is the operating fluid. This exhausts the operating fluid and reduces the pressure within the cylinder, allowing the piston to be returned to its neutral rest position under the influence of spring means 75. The return motion drives reciprocating piston rod 67 towards the bottom of FIG. 8. This movement causes pin engaging member 70 to disengage the ratchet pin 62 which it has moved into the position 62b. As the pawl returns to bring the pin engaging element 70 into position to engage the pin now at 62a, the outer curved surface 70a of pin engaging element 70 engages the pin at this latter position as shown in solid lines in FIG. 8a, and by cam action deflects the pawl to pass around pin 62a of the ratchet wheel. The pawl swings to the right about pivot 66, as viewed in FIG. 8 so that the pawl does not cause reverse movement of the ratchet wheel during the return stroke. After pin engaging element 70 has passed the pin at the position 62a, the force continuously exerted by spring 68 urges the pawl back to the position shown in solid lines in FIG. 8 in which the pawl is in contact with one or more of the ratchet pins. The pin engaging elements are now restored to the path of pin 62. This represents the end of one complete operative cycle of the motor means; and the motor means and pawl are now ready for another stroke in either direction.

Movement of the rotary valve disc 27 and carrier 23 in the reverse direction is accomplished by energizing solenoid 92. Energization of this solenoid admits operating fluid under pressure into the cylinder space at the far side of piston 74, with reference to FIG. 8, driving the piston downwardly in the drawing until it comes into contact with face 79a on head plug 79 forming the other end wall of the cylinder. Contact with face 79a limits the power stroke in this direction and determines the travel imparted to pawl 65 in the same manner that face 78a determines the travel of the pawl in the opposite direction. With the power stroke now in the direction just described, the pin engaging element 69 is pushed into engagement with the ratchet pin at the position 62b and movement of the pawl during the power stroke moves this pin to the position 62a, causing rotation in a clockwise direction (in FIG. 8) of ratchet 60. This rotary motion is imparted to disc carrier 23 through the train previously described, but it will be realized that the motion is now in the opposite direction to that previous. Now the motion is in a direction to move valve disc 27 and carrier 23 from the open to the closed position, that is, from the position of FIG. 5 to the position of FIG. 7.

When solenoid 92 is de-energized, spring means 75 returns piston 74 to the normal rest position, which is normally about midway between faces 78a and 79a. During this return stroke of the pawl, the outer cam face 69a of pin engaging element 69 strikes against ratchet pin at the position 62b, deflecting the entire pawl in the direction previously described, that is, swinging the pawl to the right in FIG. 8 around pivot 66. This deflection allows pin engaging element 69 to pass around the pin at position 62b, after which the pawl swings back to the position shown in solid lines at FIG. 8 under the influence of spring 68. This terminates the operating cycle of the motor means and pawl during a movement to close the valve means and returns the pawl to a position at which it is able to engage another ratchet pin for a stroke in either direction.

It is desired that the ratchet wheel remain in the position to which it is moved by a power stroke of the pawl and not be moved by a pin engaging element sliding over a pin 62. For this reason it may be desired to use spring 85 which seats in a socket in bushing 58 and bears against the facing end of shaft 56. This pressure of spring 85 provides sufficient resistance to rotation of the shaft that the drag of faces 69a and 70a over pins 62 does not move the ratchet away from the position occupied at the end of each power stroke.

Rachet pins 62 are equally spaced at a suitable angle around the axis of shaft 56. A convenient angle for this purpose is 30°. The travel of pawl 65 is so designed that a power stroke in either direction moves ratchet wheel 60 by an amount exactly equal to the spacing between two successive pins 62, that is wheel 60 is turned through an angle of 30°. Worm 55 and worm wheel 54 constitute a gear reduction means in the drive train and this gear reduction is conveniently made in the ratio of 30:1. Consequently the operating member 50 and the rotary valve are each moved through an angle of 1° for every power stroke of pawl 65. For obvious reasons, the spacing between the two engaging elements 69 and 70 is greater than the spacing between two successive pins 62; and for this reason the total length of the power stroke of pawl 65 is also greater than the spacing between two pins 62. However, it is the termination of each power stroke that controls the net amount of movement of the ratchet wheel and this in turn is determined by the location of the two stop faces 78a and 79a.

From the foregoing description it will be appreciated that the motor means driving the pawl and the ratchet followed by the reduction gearing provide means which are connected to and move the operating member 50 of valve operator 11, in either direction by movements of predetermined amounts, in this case, increments of 1°. These movements are preferably always equal to each other, either in the same or opposite directions, neglecting backlash manufacturing errors, and other sources of negligible error or inequality. The mechanism is preferably designed to rotate the operating member in either direction in order that the valve may be moved in one direction to close it and in the other direction to open it, thus making the operator universally applicable to many types of valves. However, in the present instance it will be appreciated that the valve comprising the two discs 22 can be rotated continuously in one direction to both open or close it. Thus, starting with the full open position of FIG. 5, rotation of carrier 23 and its associated disc in either direction for 180° moves through the cycle from full open through closed and back to full open position.

It is obviously advantageous to be able to determine at any time the exact position of the valve controlled by operator 11. For this purpose, operating shaft 50 projects through one wall of housing 44 and on the projecting end thereof carries pointer 105 which has a hub 106 by which the pointer is mounted on the shaft. The hub is held against rotation relative to the shaft by means of set screw 107. Pointer 105 cooperates with arcuate scale 108 to indicate the position of the valve. Any suitable graduations on the scale may be used as desired. For example, scale 108 may be graduated in degrees. On the other hand, it may be a direct reading scale indicating the size of the net opening available through discs 22. As illustrated in FIG. 2, the scale 108 indicates the position of pointer 105 through an angle of 90°. When pointer 105 is vertical it points to the position marked "Off" on the scale. This is the relative position of discs 22 illustrated in FIG. 7 in which the two sets of openings 28 are rotated completely out of alignment and the valve is closed. As carrier 23 is rotated in a counterclockwise direction through an angle 109, the two sets of openings 28 are brought into tangency as shown in FIG. 6, at which point the valve begins to open. This is indicated in FIG. 2 upon scale 108 as the zero point. Continued rotation of carrier 23 in a counterclockwise direction brings the two sets of openings 28 into full registration as in FIG. 5. This is indicated by movement of pointer 105 through an angle of 90° to the scale position marked "16."

The valve operator as so far described is designed for power operation. It may be desirable at times to provide for manual operation; and in this case it is necessary to disengage pawl 65 from the ratchet wheel. This is accomplished by eccentrically mounting pin 110 on shaft 111 which is rotatably mounted in a suitable manner in bushing 112 carried on the upper wall of housing 44 so that shaft 111 projects outwardly from the housing. Handle 114 is provided on the outer end of the shaft so that the shaft may be turned manually. In the position shown in FIGS. 1, 3 and 9, pin 110 projects into an opening within the perimeter of pawl 65 but does not engage the pawl within its normal range of movement as it moves either longitudinally with rod 67 or swings from side to side as it is deflected from engagement with pins 62. However, by rotating shaft 111 through an angle of 90° pin 110 is moved to the dotted line position 110a shown in FIG. 8 in which the pin engages pawl 65 and swings it about pivot 66 sufficiently far that the two pin engaging elements 69 and 70 are removed entirely from the path of pins 62 on the ratchet wheel.

The end of shaft 56 turning ratchet wheel 60 likewise projects upwardly through the top wall of operator housing 44 and has a squared end. By applying a wrench to this end of the shaft, it may be rotated manually through any desired angle.

Power operation of the operator may be restored by returning eccentric pin 110 to the position in which it disengages pawl 65, permitting the pawl to operate in the normal manner as described. It is preferable that shaft 65 carry a detent mechanism, such as the spring-loaded ball 115 which, at either end of its normal range enters a depression in the cylindrical bore surrounding the shaft, thus holding the shaft against accidental displacement from either terminal position. As also shown in FIG. 10, it may be desirable to provide a pair of pins 116 each of which is engageable with a radially extending pin 117 carried by shaft 111 to limit the rotational movement of the shaft to prevent the operator from overrunning the proper terminal positions for manual and power operation of the device.

Figure 11:
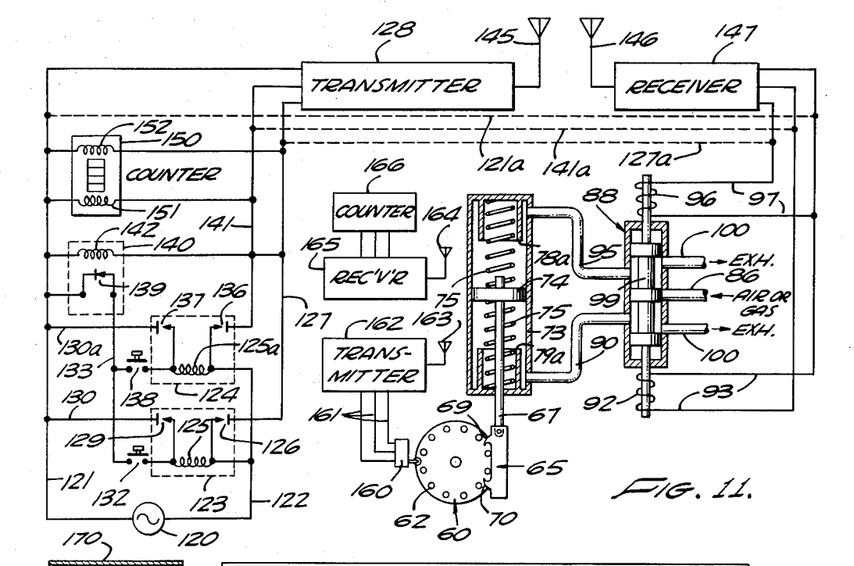
FIG. 11 is a view diagrammatically showing the valve operator and a schematic of the electrical control circuitry for activating the operator and for counting the operating pulses to indicate the valve positions.

An electrical circuit for activating and controlling the valve operator is disclosed in FIG. 11, this circuit being particularly adapted to control of the operator from a remote position. Power for the control is derived from any suitable source indicated generally at 120 and to which are connected conductors 121 and 122. Conductor 121 serves as a common return for all of the components of the circuit. Conductor 122 is connected to each of two relays 123 and 124, and more especially to the first terminal of the respective holding coils 125 and 125a of the two relays. This first terminal of relay 123 is connected also to one contact of switch 126, the other contact of the switch being connected to conductor 127 which leads to radio transmitter 128, as does also conductor 121.

The other terminal of holding coil 125 is connected through switch 129 and conductor 130 to the conductor 121. The same terminal is likewise serially connected through manually operated push button 132 and conductor 133 to conductor 121 through a relay to be described. The switches at contacts 126 and 129 are normally open and are closed when coil 125 is energized.

Relay 124 is similar in construction to relay 123 and is connected in parallel with it between conductors 122 and 121. It has corresponding normally open switches at 136 and 137; and manually operated push button 138 is connected in series with the holding coil between the relay and conductor 133. Conductor 133 is connected through normally closed switch 139 of relay 14 with common return 12. Switch 136 is connected by conductor 141 with transmitter 128 while switch 137 is connected by conductor 130a to return 121.

Holding coil 142 of relay 140 is connected between common return 121 and both conductors 127 and 141 in order to be energized when either of conductors 127 or 141 is carrying current.

Operation of the power actuator in a forward direction is effected by depressing push button 132 which completes the circuit through the holding coil of the first relay 123, thus closing the switches at both 126 and 129, and maintaining the circuit through the holding coil and also the circuit to the transmitter after the push button is released. Current delivered to the input of the radio transmitter produces a radio signal which passes from transmitting antenna 145 to receiving antenna 146 and thence to receiver 147. Receiver 147 produces an operating pulse similar to that received by transmitter 128, and routes the operating pulse from the receiver output by way of conductors 93 to solenoid 92. The result is operation of the valve operator in the manner previously described. The resultant motion of pawl 65 is in a direction to move the valve toward the closed position.

To open valve 10 by reversing the direction of motion of operator 11, button 138 is depressed. This closes switches 136 and 137 by energizing coil 125a and the current to transmitter over conductors 121 and 141 produces a radio signal. This signal is different in some way from the first signal described and receiver 147 can distinguish between the two. In response to the latter signal, an electrical operating pulse is sent by receiver 147 over conductors to solenoid 96 to actuate the operator in a manner to move valve 11 toward a closed position.

Radio transmitter 128 and receiver 147 have been shown assuming a substantial distance between the control point with the push buttons and the operator. Should they be relatively close, it is simpler to use wired connections, and the conductors 121, 127 and 141 can be connected directly to conductor pairs 93 and 97 as shown at 121a, 127a and 141a, respectively.

Relay 123 preferably has a built-in time delay of any suitable type which automatically de-energizes holding coil 125, as by opening switch 129, a predetermined length of time after the circuit through coil 125 is closed by button 132. The time delay should correspond to the time required for completion of the power stroke of pawl 65. Assuming that this can be accomplished in a period of one second, the time delay is of the order of one second or longer in order to insure pawl 65 making a full operation or power stroke, after which the relays are de-energized, which in turn de-energizes solenoid 92 and allows the pawl to return to its normal rest position in the manner described above. Relay 124 has a similar time delay action.

Since the return stroke of the pawl requires approximately the same length of time as the power or operating stroke to complete, it is desirable that the electric circuit include means preventing the repeated energization of either relay 123 or 124 at intervals of time shorter than the complete operating cycle of pawl 65 which may be assumed to be two times one second or two seconds. For this purpose the electric control circuit includes relay 140 of which switch 139 is normally closed. Upon energization of the transmitter through either of conductors 127 or 141, current also flows through coil 142 of relay 140, opening the contacts of switch 139. Relay 140 has a built-in time delay device which prevents the two contacts from again engaging each other for the two second interval described above, thus allowing ample time for the valve operator 11 to move through a complete operating cycle consisting of a power stroke and a return stroke of pawl 65.

As described above, it is optional but usually preferable to provide suitable means for indicating the position of the valve which is moved by operator 11. When the valve is controlled from a remote point as by the circuit illustrated in FIG. 11, it is preferable that means be available at the control station to indicate the valve position. For this reason the circuit includes digital counter 150 which continuously indicates the algebraic sum of the successive power strokes of the operating member. This is accomplished by providing counter 150 with two operating coils 151 and 152. Each time the push button 132 is depressed, the operator moves the valve toward the full open position. This movement may be regarded as advance or plus movement; and each time it occurs operating coil 152, connected between conductors 127 and 121, is energized by the electrical pulse transmitted to transmitter 128. This electrical pulse in coil 152 causes counter 150 to add one to the accumulated digital count indicated by the counter. Conversely, when push button 138 is depressed, the valve operator is actuated in the reverse direction to close the valve controlled thereby. This movement may be regarded as reverse movement or minus movement of counting purposes. Thus, whenever push button 138 is depressed and an electrical pulse is transmitted to transmitter 128 through conductor 141, coil 151 connected across between conductors 121 and 141, is energized. This coil operates counter 150 in a direction to subtract one from the digital count indicated by the counter. Thus, the counter continuously indicates the algebraic sum of the successive angular movements of the operating member and thereby indicates the net or resultant movement of the valve away from a known starting position.

Another optional feature is the repeater arrangement shown in FIG. 11. This involves a double throw, normally open switch 160 connected by three conductors 161 to radio transmitter 162. Switch 160 has an operating arm which projects into the circular path of ratchet pins 62 and when moved in one direction or the other closes one of the two normally open switches to transmit through a pair of the conductors 161 a signal which causes transmitter 162 to send out a radio signal over antenna 163. This radio signal is received by antenna 164 and receiver 165. Transmitter 162 is capable of sending two different types of pulses and receiver 165 is capable of discriminating between them to produce one of two different output pulses. The output pulses of receiver 165 are fed into counter 166, which is a digital counter similar to counter 150. The counter receives plus and minus impulses which are algebraically recorded by the digital counter to indicate the current position of the valve as a result of a plurality of movements of ratchet pin 162.

This secondary counter may serve either of two purposes. If counter 166 and counter 150 are located at the same position, then comparison of the two of them will indicate whether or not every impulse generated in the control circuit has resulted in actual movement of ratchet wheel 60 and therefore of the valve itself. Alternatively, counter 166 may be at a location removed from the position of counter 150, so that a duplicate reading of the valve position may be obtained at another location. Obviously, counter 166 may be connected directly to conductors 161 if it is close enough switch 160, omitting the radio link.

Figures 12, 13, 14:
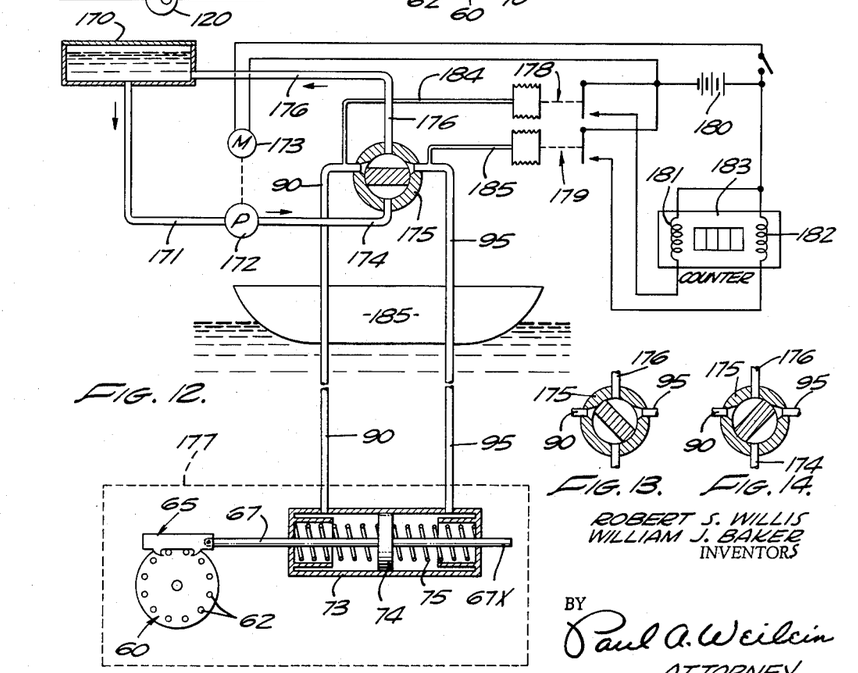
FIG. 12 is a similar view showing a modified form of control means for activating the operator and remotely indicating the valve position.
FIGS. 13 and 14 are views diagrammatically indicating various operating positions of the control valve in FIG. 12.

FIG. 12 illustrates a hydraulic control system for the valve operator in which hydraulic fluid is supplied to operating cylinder 73 through either of the two conduits 90 and 95. In this system, a supply of hydraulic fluid is maintained in reservoir 170 and is supplied through conduit 171 to the input of hydraulic pump 172. The pump is driven by a suitable prime mover, for example, an electric motor 173 connected to any suitable source of power, for example, battery 180. The output of pump 172 passes through conduit 174 to the inlet port of a three-way valve 175. A return line from valve 174 to reservoir 170 is provided at 176. Valve 175 has two discharge ports which are connected respectively to conduits 90 and 95, and a return port connected to line 176. Valve 175 can be operated by any suitable means, but for the sake of simplicity it may be assumed to be manually operated.

Valve 175 is a three-position valve illustrated here only diagrammatically since the precise structure is immaterial. In the center or neutral position the inlet port is closed and the two discharge ports are in communication with the return line and therefore with each other, as indicated in FIG. 12. It may be moved to either of two operating positions as indiacted in FIGS. 13 and 14, in which one discharge port is connected internally with the inlet port and the other discharge port is connected to the return port and line 176. Such valves are available commercially, one being Barksdale "Manipulator Valve," No. 2801MC–A. Pump 172 may be assumed to be any suitable centrifugal pump that will turn even with no output, or else a positive displacement pump equipped with a relief valve by-passing hydraulic fluid to the reservoir in a closed cycle.

In the position shown in FIG. 12, valve 175 is in the neutral position and the hydraulic pressures at opposite sides of the piston 74 are equal, the hydrostatic pressure being determined by the vertical height of conduits 90 and 95. Assume now that the valve is moved to the position of FIG. 13. Conduit 174 is now placed in communication through the valve with conduit 90 and hydraulic fluid is supplied under pump pressure to cylinder 73 at one side (left hand side) of piston 74 to operate rod 67 and pawl 65 in the manner previously described. Hydraulic fluid at the other side of the piston is exhausted to the reservoir through conduit 95 and return line 176, the two lines being in communication through valve 175. This permits piston 74 to move to the right in FIG. 12 for a power stroke.

The operating cycle is then completed by returning valve 175 to the neutral position in order to equalize fluid pressures in cylinder 73 at both sides of the piston. Spring means 75 can now return the piston to the midposition and exhaust a portion of the fluid at the left side of the piston through line 90. This permits the piston to return to the normal rest position. To avoid unbalanced hydraulic pressures on the piston, piston rod 67 has an extension 67x projecting through the opposite end wall 78 of the cylinder. Ratchet 65 is thereby returned in the opposite direction to its central position in which it is again ready to engage a pin on the ratchet wheel.

If the valve is placed in the second operating position of FIG. 14, the inlet port and line 174 are placed in communication with conduit 95, while conduit 90 is in communication through the valve with return line 174 and reservoir 170. It is obvious from prior description that piston 74 and rod 67 are now moved to the left in FIG. 12 for a power stroke and are then returned to the rest position by returning valve 175 to neutral. Repeated manipulations of valve 175 result in repeated movements of piston 74 which, through the drive means including the ratchet and reduction gears described before, turns the valve operated by the device. It is preferred to enclose the entire operator and valve assembly in an envelope or housing indicated diagrammatically at 177.

In order to give a continuous indication of the valve position, a pair of pressure operated switches 178 and 179 are provided. These are normally open switches each wired in series with a source of power, for example, battery 180 and with one of the coils 181 or 182, respectively, of counter 183. Pressure sensitive switch 178 is connected by suitable conduit 184 with conduit 90 while switch 179 is similarly connected through conduit 185 with conduit 95. Thus, as the pressure is one of the conduits 90 and 95 is raised to produce an operating stroke of piston 74, the pressure pulse is transmitted through one of conduits 184 or 185 to the associated switch 178 or 179, respectively. Assuming this switch 178 is closed, coil 181 of the counter is energized, which adds one to the digital count indicated by the counter. If switch 179 is energized, then coil 182 of the counter is energized and this subtracts one from the digital count indicated by the counter. Thus, the counter adds or subtracts from the total count indicated by it, pressure pulses transmitted to the valve operator and always indicates the algebraic sum of these pressure pulses, thus giving a continuous record of the valve position.

The rotary valve 10 is of the type frequently used at the well head to regulate fluid flow in producing oil wells and consequently may be at times located at a point difficult of access. For example, the valve may be located at the well head of an offshore well, and thus be submerged under many feet of water. In that instance, most of the hydraulic control system as well as the indicating means illustrated in FIG. 12 may be contained on a stationary platform over the well or carried on a floating barge as indicated at 185 in the figure.

From the foregoing description it will be appreciated that various changes in the detailed structure and arrangement of the various elements of the operator and the control system therfor may occur to persons skilled in the art without departing from the spirit and scope of the present invention. Since it is the intention that all such modifications be included within the scope of the appended claims, it is to be understood that the foregoing description is considered as being illustrative of, rather than limitative upon, the invention as defined by the appended claims.

What is claimed is:

1. A valve operator for a valve having a movable member, comprising: a movably mounted operating member having means for driving connection to a valve member; motor means including a driving member moving from a rest position in either of two directions; and double acting ratchet means drivingly connected to said driving member to rotate the operating member in either of two directions; said motor means comprising a double acting fluid operating piston and cylinder assembly; spring means biasing said piston to an intermediate position in said cylinder prior to each power stroke; and stop means in said cylinder for limiting the piston travel in either direction away from said intermediate position.

2. A valve operator for a valve having a rotatable valve member, comprising: an operating member having means for driving connection to a valve member; means mounting the operating member for rotation; an annularly arranged series of spaced pins mounted on means drivingly associated with the operating member for rotation therewith; motor means including a reciprocating drive member; an extension on the drive member carrying a pair of rigid, spaced, oppositely facing pin engaging elements each drivingly engageable with one of said pins during a portion at least of strokes of the drive member in opposite directions; pivot means interconnecting the drive member and the extension; spring means biasing the extension to a pin engaging position; and cam means carried by the extension deflecting the extension from driving engagement with said pins during the return movement of the extension over said portion of each stroke.

3. Valve operating means for a valve having a rotatable member, comprising: an operating member having means for driving connection to a valve member; means rotatably mounting the operating member; drive means rotating the operating member in either direction by repeated angular movements of predetermined amount; means operable remotely from the drive means to activate the drive means for movement of the operating member in a selected direction; and means operatively responsive to the movements of said operating member for continuously indicating the algebraic sum of the successive angular movements of the operating member.

4. Valve operating means for a valve having a rotatable member, comprising: an operating member having means for driving connection to a valve member; means rotatably mounting the operating member; drive means including motor means rotating the operating member in either direction by repeated angular movements of predetermined equal amount; and means operable remotely from the drive means to activate the drive means for movement of the operating member in a selected direction; said motor means comprising a cylinder, a piston movable therein, spring means biasing the piston to a rest position between the ends of the cylinder, and valve controlled means introducing operating fluid under pressure into the cylinder at a selected side of the piston.

5. A valve operator as in claim 4 in which the means introducing operating fluid into the cylinder includes a source of operating fluid under pressure, conduit means connecting the source of the cylinder at both sides of the piston; and valve means for said conduit means controlling flow of fluid into the cylinder to introduce operating fluid at a selected side of the piston.

6. A valve operator as in claim 5 that additionally includes solenoid means operating the valve means.

7. A valve operator for a valve having a rotatable valve actuator, comprising: a housing; an operator shaft journalled in said housing and having means connectable to said valve actuator; a gear fixed on said operator shaft; a second shaft journalled in said housing and having a gear engaged with the gear on said operator shaft and also having a ratchet wheel; said ratchet wheel having thereon a plurality of circumferentially and equidistantly spaced projections; a motor shaft extending into said housing and having an extension at its inner end provided with oppositely facing projections engageable with said projections on said wheel; means pivotally connecting said extension to said motor shaft; means normally biasing said extension towards said wheel for co-engagement between said projections on said extension and on said wheel; said projections on said extension spanning an adjacent pair of projections on said wheel; cam means for moving said extension away from said wheel following longitudinal movement of said motor shaft in either direction and consequent rotation of said wheel and said shafts; and motor means for effecting reciprocation of said motor shaft.

8. A valve operator as defined in claim 7 including, a member projecting through a wall of said housing into the latter and having means engageable with said extension for moving the same positively away from said wheel; said second shaft having means disposed exteriorly of said housing to enable manual rotation of said second shaft.

9. A valve actuator as defined in claim 8 wherein said motor means comprises a cylinder; a piston connected to said motor shaft and reciprocable in said cylinder; closure means at the ends of said cylinder; said motor shaft projecting through one of said closure means; means normally maintaining said piston centralized within said cylinder with said projections on said extension spanning said pair of projections on said wheel; and means for selectively admitting fluid under pressure into said cylinder at either side of said piston to effect movement of said actuator shaft in one direction or the other.

References Cited by the Examiner

UNITED STATES PATENTS

| | | | |
|---|---|---|---|
| 1,126,084 | 1/15 | Reisbach | 74—128 |
| 1,477,897 | 12/23 | Porell | 251—230 |
| 1,630,164 | 5/27 | Bryant | 74—160 |
| 1,842,382 | 1/32 | Arey | 251—230 X |
| 1,876,822 | 9/32 | Mansure | 251—230 X |
| 2,385,409 | 9/45 | Gardner | 74—128 |
| 2,637,341 | 5/53 | Borst | 92—131 X |
| 2,905,029 | 9/59 | Gustafson | 91—2 X |
| 2,978,872 | 4/61 | Curran et al. | 91—459 X |
| 3,059,663 | 10/62 | Whitenack | 251—30 X |
| 3,081,942 | 3/63 | Maclay | 91—459 X |

M. CARY NELSON, *Primary Examiner.*

UNITED STATES PATENT OFFICE
CERTIFICATE OF CORRECTION

Patent No. 3,203,266                                                           August 31, 1965

Robert S. Willis et al.

It is hereby certified that error appears in the above numbered patent requiring correction and that the said Letters Patent should read as corrected below.

Column 4, lines 13 and 14, for "movable", each occurrence, read -- removable --; column 6, line 1, strike out "to the open position of FIG. 7".

Signed and sealed this 2nd day of August 1966.

(SEAL)
Attest:

ERNEST W. SWIDER
Attesting Officer

EDWARD J. BRENNER
                                                                          Commissioner of Patents